United States Patent
Furio et al.

(10) Patent No.: US 8,677,422 B2
(45) Date of Patent: Mar. 18, 2014

(54) VEHICLE SEAT INTERCONNECT, METHOD AND VEHICLE SEAT DATA SYSTEM

(75) Inventors: Miguel Angel Furio, Chaville (FR); Christian Koppe, Alsbach-Hähnlein (DE); Shivaprakash Kainthaje Ramachandra, Bangalor (IN); Niranjan Hegde Kundapur, Bangalore (IN)

(73) Assignee: Tyco Electronics UK Ltd., Wiltshire (GB)

( * ) Notice: Subject to any disclaimer, the term of this patent is extended or adjusted under 35 U.S.C. 154(b) by 759 days.

(21) Appl. No.: 12/141,372

(22) Filed: Jun. 18, 2008

(65) Prior Publication Data

US 2009/0007191 A1 Jan. 1, 2009

(30) Foreign Application Priority Data

Jun. 28, 2007 (GB) .................................. 0712574.3

(51) Int. Cl.
*H04N 7/18* (2006.01)
*H04N 21/414* (2011.01)
(52) U.S. Cl.
CPC .............................. *H04N 21/41422* (2013.01)
USPC .......................................................... 725/75
(58) Field of Classification Search
USPC .......................................................... 725/75
See application file for complete search history.

(56) References Cited

U.S. PATENT DOCUMENTS

| 4,428,078 | A |   | 1/1984  | Kuo |
| 4,736,452 | A | * | 4/1988  | Daniels et al. ............... 455/41.1 |
| 4,853,555 | A |   | 8/1989  | Wheat |
| 4,897,714 | A | * | 1/1990  | Ichise et al. ..................... 725/76 |
| 5,230,085 | A |   | 7/1993  | Loposer |
| 5,994,977 | A | * | 11/1999 | Taya ............................. 333/111 |
| 2004/0098745 | A1 |   | 5/2004  | Marston et al. |
| 2006/0234700 | A1 | * | 10/2006 | Funderburk et al. .......... 455/431 |
| 2006/0271970 | A1 | * | 11/2006 | Mitchell et al. ................. 725/82 |

FOREIGN PATENT DOCUMENTS

| EP | 0 260 725 A3 | 3/1988 |
| EP | 0 277 014 A3 | 8/1988 |
| EP | 0279608 A2   | 8/1988 |

OTHER PUBLICATIONS

European Search Report cited in co-pending Application No. EP2008862, dated Nov. 3, 2010, 3 pages.

* cited by examiner

*Primary Examiner* — Bennett Ingvoldstad
(74) *Attorney, Agent, or Firm* — Barley Snyder

(57) ABSTRACT

A vehicle seat interconnect includes a cable that propagates data signals along a length of the cable and a transceiver provided on at least one vehicle seat of a vehicle. The transceiver is wirelessly coupled with the cable and transmits the data signals between the transceiver and the cable.

19 Claims, 3 Drawing Sheets

VEHICLE SEAT INTERCONNECT, METHOD AND VEHICLE SEAT DATA SYSTEM

CROSS-REFERENCE TO RELATED APPLICATIONS

This application claims the benefit of the filing date under 35 U.S.C. §119(a)-(d) of Great Britain Patent Application No. GB 0712574.3, filed Jun. 28, 2007.

FIELD OF THE INVENTION

The present invention relates to a vehicle seat interconnect and a vehicle seat data system wherein a cable propagates data signals along a length of the cable, and a transceiver is wirelessly coupled with the cable and transmits the data signals between the transceiver and the cable.

BACKGROUND

In a vehicle which has multiple vehicle seats such as, for example, an aircraft, a bus or a coach, the vehicle seats are typically provided in rows. Where an entertainment system is provided each of the rows of the vehicle seats typically needs to be coupled to the entertainment system. Each of the vehicle seats will typically have control devices for controlling the entertainment system, as well as audio devices for transmitting or receiving audio data. Visual display units are generally mounted in a back of each of the vehicle seats so that a user can operate the visual display unit mounted in the back of the vehicle seat in front of them.

A cable harness is provided which couples the rows of the vehicle seats together. The cable harness typically attaches to a vehicle seat distribution box provided for each of the rows of the vehicle seats, with the cables running in conduits under the floor between the rows of the vehicle seats. To enable the distance or pitch between the rows of the vehicle seats to be altered, vehicle seat rails are provided which are fixed to the floor of the vehicle and which receive vehicle seat legs. The vehicle seats can be positioned in the desired location along the vehicle seat rails and then fixed in place. Once in place, the cable harness runs from the vehicle seat distribution box and into a recess in the vehicle seat rail. The cable harness then exits the vehicle seat rail near the adjacent row and couples to the vehicle seat distribution box. The recess is typically covered by an extrusion to protect the cable harness therein. Hence, the rows of the vehicle seats are coupled together to enable control of the entertainment system to be achieved and the cabling is neatly concealed within the vehicle seat rail. An alternative arrangement provides so-called "spacers" which are rigid mechanical and electrical couplings of fixed length which couple with an interface provided within the vehicle seat legs of each of the vehicle seats. The spacers are retained in the inter-vehicle seat gap of the vehicle seat rail.

When it is desired to change the pitch of the vehicle seats it is necessary to remove the extrusion protecting the cable harness, to uncouple the cable harness from the vehicle seat distribution boxes and to withdraw the cable harness from at least the region of the vehicle seat rail into which the vehicle seat will be moved. Once the vehicle seat has been moved, the cable is reinserted into the vehicle seat rail up to the vehicle seat and reconnected to the vehicle seat distribution box. The cable harness is typically pulled to remove any slack and then connected to the next vehicle seat distribution box. In the event that the pitch of the vehicle seats is decreased, any excess cable harness must be somehow accommodated within the vehicle seat rail or, if this is not possible, a shorter cable harness used. Conversely, if the pitch of the vehicle seats is increased and the existing cable harness is too short, then a longer cable harness must be provided. In any event, each connection then needs to be retested since the mechanical connection between the vehicle seat distribution box and the cable harness has been broken and remade.

SUMMARY

The invention provides a vehicle seat interconnect comprising a cable that propagates data signals along a length of the cable. A transceiver is provided on at least one vehicle seat of a vehicle. The transceiver is wirelessly coupled with the cable and transmits the data signals between the transceiver and the cable.

The invention further provides a method of interconnecting at least one vehicle seat with a vehicle seat data system comprising: propagating data signals along a cable; wirelessly coupling a transceiver provided on the vehicle seat with the cable; and transmitting data signals between the transceiver and the cable.

DETAILED DESCRIPTION OF THE EMBODIMENT(S)

Figure 1:
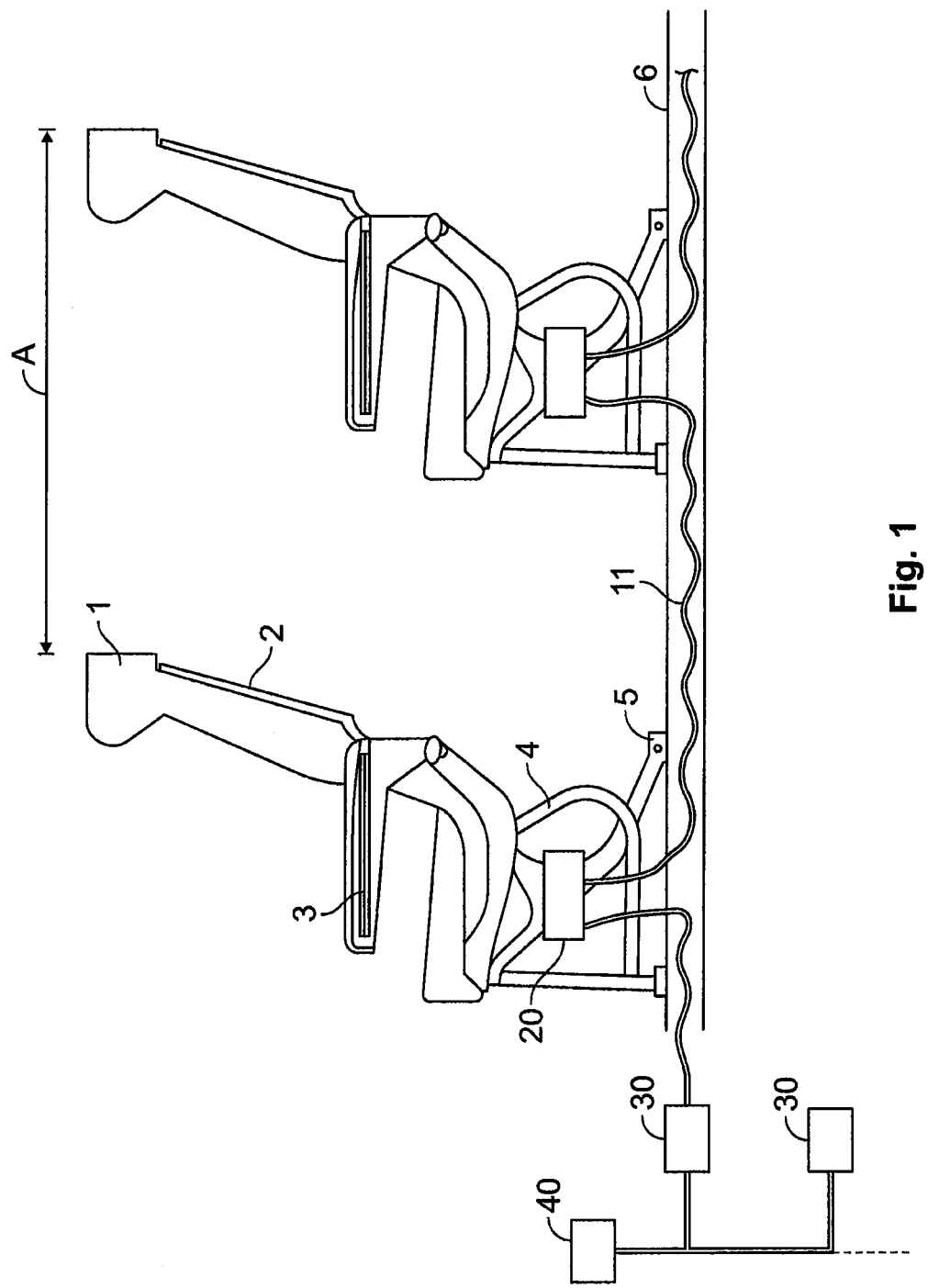
FIG. 1 is a side elevation view schematically illustrating an existing vehicle seat interconnect showing vehicle seats on a vehicle seat rail.
Figure 3:
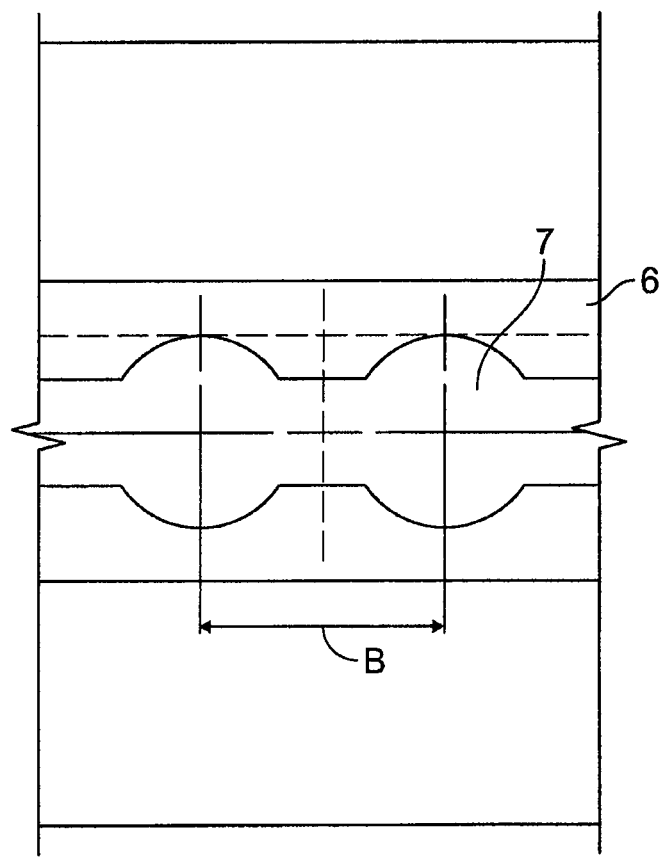
FIG. 3 is a plan view of a portion of the vehicle seat rail.

FIG. 1 shows an example of an existing vehicle seat interconnect showing vehicle seats 1 on a vehicle seat rail 6. The vehicle seat rail 6 is mounted to a floor of the vehicle. Legs 4 of the vehicle seat 1 are mounted to the vehicle seat rail 6 and fixed in position using vehicle seat mounts 5. As shown in FIG. 3, the vehicle seat rail 6 is provided with a number of recesses 7 that receive the vehicle seat mounts 5 to lock the vehicle seat 1 in position. Typically, the step or spacing B between the recesses 7 is fixed. The spacing B may be, for example, about 1 inch (25.4 millimeters). A distance or pitch A between the vehicle seats 1 may be varied to suit different configuration needs of the vehicle housing the vehicle seats 1.

An armrest of the vehicle seat 1 will typically house control devices 3 for interaction with a vehicle information system such as, for example, a floor distribution box 30 and an area distribution box 40 of an entertainment system. The control devices 3 will typically operate a visual display unit 2 mounted on a back side of at least one of the vehicle seats 1. To pass signals between the vehicle seats 1, each of the vehicle seats 1 or row of the vehicle seats 1 is provided with a vehicle seat distribution box 20 which is coupled with the control devices 3 and the visual display unit 2.

Figure 2:
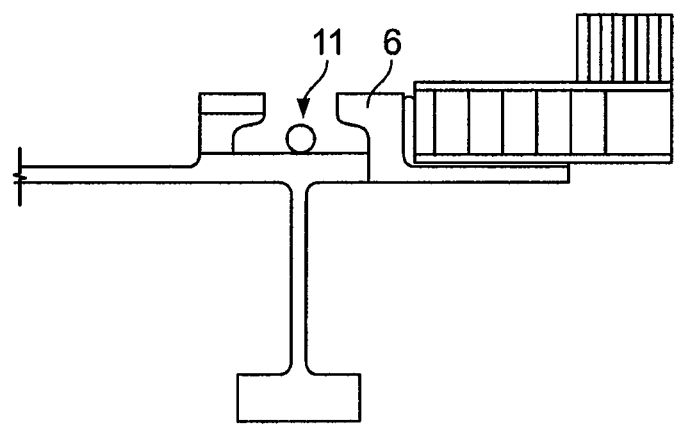
FIG. 2 is a sectional view of the vehicle seat rail.

The vehicle seat distribution box 20 is coupled with adjacent vehicle seat distribution boxes 20 via a cable harness 11. The cable harness 11 runs in a conduit provided in the vehicle seat rail 6. As shown in FIG. 2, the cable harness 11 is retained within the vehicle seat rail 6 in at least a region between the vehicle seats 1. The cable harness 11 is protected by a track cover (not shown) which is mounted over the vehicle seat rail 6 for safety reasons. As shown in FIG. 1, the cable harness 11 is coupled with the floor distribution box 30, which in turn is coupled with the area distribution box 40. The area distribution box 40 and the floor distribution boxes 30 enable the entertainment system to be controlled and distributed throughout the vehicle.

Figure 4:
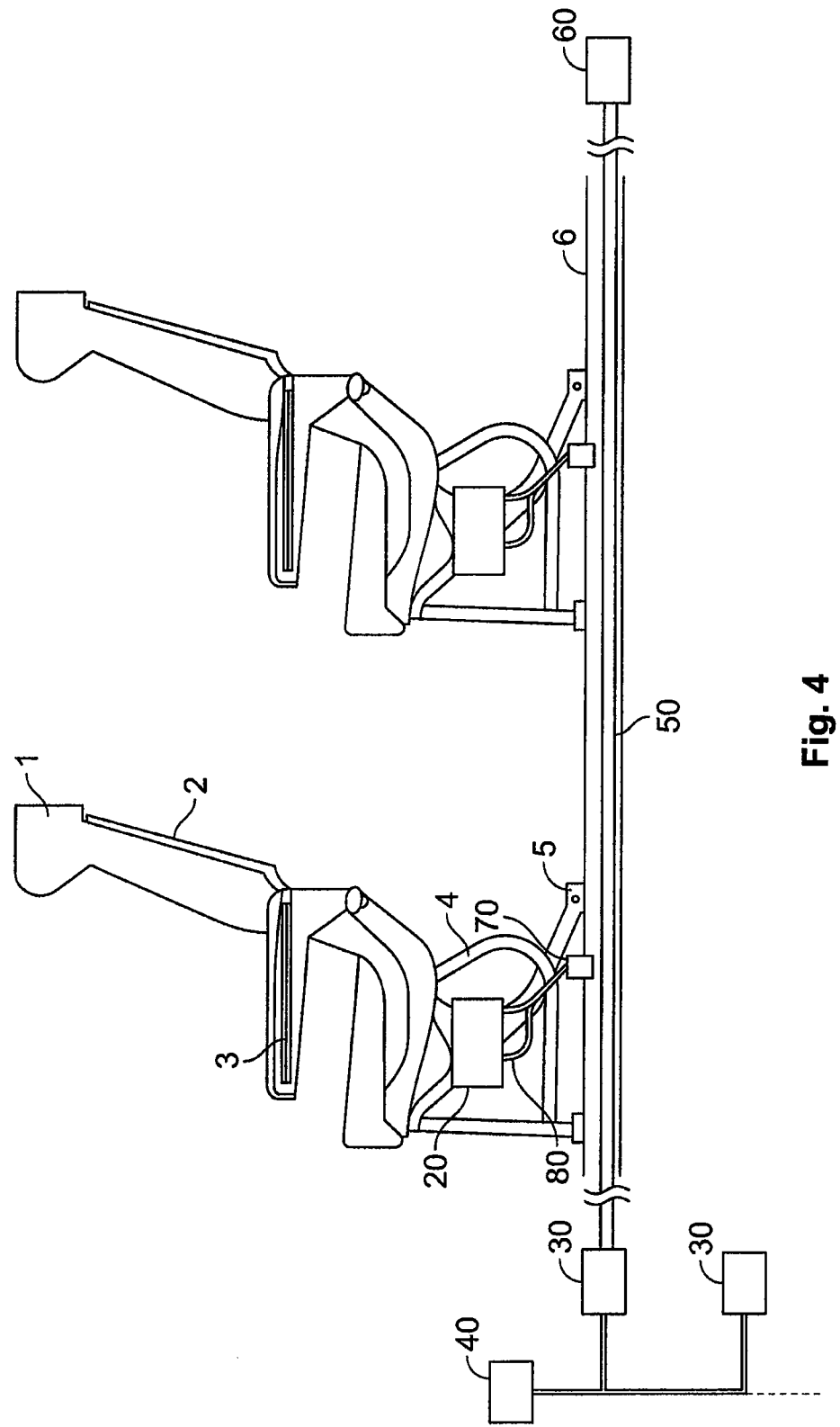
FIG. 4 is a side elevation view schematically illustrating a vehicle seat interconnect and vehicle seat data system according to an embodiment of the invention. detailed description of the drawings

FIG. 4 shows a vehicle seat interconnect and a vehicle seat data system according to an embodiment of the invention. The vehicle seat 1, the vehicle seat distribution box 20, the area distribution box 40, and the floor distribution boxes 30 shown in FIG. 4 are identical to those shown in FIG. 1. However, the connection between the vehicle seat distribution box 20 and the floor distribution boxes 30 is different from the connection shown in FIG. 1.

As shown in FIG. 4, a cable 50 is provided within the vehicle seat rail 6. The cable 50 may be retained within a conduit of the vehicle seat rail 6 or may be provided outside or adjacent the vehicle seat rail 6. The cable 50 may be, for example, a coaxial cable operable to carry data signals, such as radio frequency (RF) data signals. The cable 50 will typically be provided with unshielded apertures along a length of the cable 50 to enable transmission of the RF data signals from and into the cable 50. The apertures will typically be spaced at a distance which matches the spacing B of the vehicle seat rail 6. The cable 50 is coupled at one end with the floor distribution box 30, which transmits and receives the RF data signals used by the entertainment system. The cable 50 is connected at an opposite end with a terminator 60 to reduce signal reflections.

Attached to the vehicle seat 1 is a transceiver 70. The transceiver 70 is operable to couple wirelessly with the cable 50 to enable the RF data signals to be transmitted between the transceiver 70 and the cable 50. The transceiver 70 then provides the RF data signals over a wiring harness 80 to the vehicle seat distribution box 20.

In the vehicle seat data system of FIG. 4, the cable 50, the transceiver 70 and the wiring harness 80 act as a direct replacement for the cable harness 11. Furthermore, the arrangement illustrated in FIG. 4 has significant advantages in that when the pitch A of the vehicle seats 1 is changed, this can be done without having to disconnect any cables from the vehicle seat distribution box 20. Instead, the vehicle seat 1 may be moved to a new position and the transceiver 70 will still wirelessly couple with the cable 50. The cable 50 can be retained in place without needing to be removed when the vehicle seat 1 is moved and the transceiver 70 located on the vehicle seat 1 will enable the RF data signals to be transmitted with the cable 50 even when the transceiver 70 is in its new location.

Furthermore, the arrangements can enable the pitch A to be selected without needing any specific cable length dedicated to that particular pitch. It will be appreciated that this significantly simplifies changing the pitch A of the vehicle seats 1 since none of the cabling infrastructure needs to be disturbed. Also, by providing the cable 50 with spaced unshielded portions, the amount of interference generated by the cable 50 is minimized. Furthermore, by matching the spacing of the unshielded portions to the spacing B of the vehicle seat rail 6, the mechanical alignment of the transceiver 70 with the cable 50 can be assured. Accordingly, the need to comprehensively test the entertainment system following a change in the pitch A can be obviated. Also, in the event that one of the vehicle seat distribution boxes 20 develops a fault, normal operation of other rows of the vehicle seats 1 can be maintained whereas in the arrangement shown in FIG. 1, a faulty one of the vehicle seat distribution boxes 20 can often cause a failure for some or all devices connected to the floor distribution box 30.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A vehicle seat interconnect, comprising:
   a vehicle seat rail having a plurality of vehicle seat receiving recesses;
   a cable having a plurality of unshielded apertures through the length of the cable that match the plurality of vehicle seat receiving recesses and that propagates data signals along a length of the cable running through one of the plurality of unshielded apertures and one of the plurality of vehicle seat receiving recesses; and
   a transceiver provided on at least one vehicle seat of a vehicle, the transceiver being wirelessly coupled with the cable and transmitting the data signals between the transceiver and the cable.

2. The vehicle seat interconnect of claim 1, wherein the transceiver receives radio frequency data signals from the cable.

3. The vehicle seat interconnect of claim 1 wherein the transceiver transmits radio frequency data signals into the cable.

4. The vehicle seat interconnect of claim 1, wherein the transceiver is coupled with a vehicle seat distribution box.

5. The vehicle seat interconnect of claim 4, wherein the transceiver is coupled with a vehicle seat distribution box via a wiring harness.

6. The vehicle seat interconnect of claim 1, wherein the unshielded areas are spaced along the cable with a spacing that matches a pitch of the vehicle seats.

7. The vehicle seat interconnect of claim 1, wherein the cable couples with a distribution box.

8. The vehicle seat interconnect of claim 7, wherein the cable couples with a terminator at an end opposite from the distribution box.

9. The vehicle seat interconnect of claim 1, wherein the cable is arranged in a seat rail on a floor of the vehicle.

10. A method of interconnecting at least one vehicle seat with a vehicle seat data system, comprising:
    providing a vehicle seat rail having a plurality of vehicle seat receiving recesses;
    providing a cable having a plurality of unshielded apertures along the vehicle seat rail and matching the plurality of vehicle seat receiving recesses;
    propagating data signals along the cable;
    wirelessly coupling a transceiver provided on the vehicle seat with the cable; and
    transmitting data signals between the transceiver and the cable through the plurality of unshielded apertures.

11. The method of claim 10, wherein radio frequency data signals are transmitted from the cable.

12. The method of claim 10, wherein radio frequency data signals are transmitted into the cable.

13. The method of claim 10, further comprising coupling the transceiver with a vehicle seat distribution box.

14. The method of claim 10, wherein the unshielded areas are spaced along the cable with a spacing that matches a pitch of the vehicle seats.

15. The method of claim 10, further comprising coupling the cable with a distribution box.

16. The method of claim 15, further comprising coupling the cable with a terminator at an end opposite from the distribution box.

17. The vehicle seat interconnect of claim 8, wherein the cable is unbroken between the distribution box and the terminator.

18. The vehicle seat interconnect of claim 13, wherein the transceiver is coupled with a vehicle seat distribution box via a wiring harness.

19. The vehicle seat interconnect of claim 16, wherein the cable is unbroken between the distribution box and the terminator.

\* \* \* \* \*